UNITED STATES PATENT OFFICE.

OSCAR E. BRANSKY, OF WHITING, INDIANA, ASSIGNOR TO STANDARD OIL COMPANY, OF WHITING, INDIANA, A CORPORATION OF INDIANA.

PURIFICATION OF HYDROCARBONS.

1,396,399.        Specification of Letters Patent.        Patented Nov. 8, 1921.

No Drawing.        Application filed November 26, 1919. Serial No. 340,883.

*To all whom it may concern:*

Be it known that I, OSCAR E. BRANSKY, a citizen of the United States, residing at Whiting, in the county of Lake and State of Indiana, have invented a new and useful Improvement in the Purification of Hydrocarbons, of which the following is a specification.

The present invention relates to the purification of petroleum hydrocarbons, or hydrocarbon oils, which have been subjected to the action of sulfuric acid and more particularly to the removal from such acid treated oils of the sulfonated compounds which remain therein by reason of the preferential solubility of these sulfonated compounds in oil after separating sludge and acid.

In the acid refining of petroleum and hydrocarbon oil by means of concentrated or fuming sulfuric it has been found that sulfonated compounds are formed which have a preferential solubility in water in the presence of oils. These compounds which appear to be largely sulfonic acids, are found in the acid sludge after the acid treatment and may be removed therefrom in a state of purity suitable for commercial purposes by first extracting from the sludge the oil-soluble sulfonic acids present by means of a light hydrocarbon oil, and subsequently removing the excess of acid from the remaining sludge by boiling with water and drawing off the dilute acid layer which settles out. The sludge contains the water-soluble sulfonated compound or "acids," which, by reason of their color, are designated as the "green sulfonic acids." The process for their preparation has been more fully described in the prior application of Robert E. Humphreys, Francis M. Rogers and myself, filed October 25, 1918, Serial No. 259,689. In the present process these "green" sulfonic acids or their alkali metal salts are utilized as hereinafter set forth.

In the acid refining of hydrocarbons by means of concentrated or fuming sulfuric acid, a certain portion of the sulfonated compounds, principally sulfo-acids, remain in solution in the oil on separation of the acid sludge. These sulfonated compounds known as the "mahogany sulfonic acids," may not be removed from the oil by means of water either in the form of acids or soaps resulting from their neutralization by a suitable alkali, such as soda ash, as they cause the formation of emulsions of water and oil which cannot readily be broken down. It has now been found, however, that by aqueous solutions of the green sulfo compounds (which term applies to both the acid compounds and their soaps) the oil-soluble sulfonated compounds may be extracted from the refined oils without the formation of stable emulsions.

To illustrate the practice of the present invention, for example, in the treatment of a lubricating oil, such as "solar red" oil, a suitable volume of the oil may be treated with sulfuric acid in a 66° Bé. solution in the proportion of about ¾ lb. of acid to each gallon of oil. The acid may be added in one or more successive dumps, the mass being agitated after each dump. After separation the sludge is drawn off, and may be treated in any desired manner for the recovery of acid, green sulfonic acids, etc. The oil, which contains the mahogany sulfonic acids, may then be neutralized, preferably with a solution of alkali metal compound, such as a 15° Bé. solution of sodium carbonate. The excess of alkali frequently separates as a clear solution, and may be removed, if desired, leaving the soaps of the mahogany acids in solution in the oil. In either case the oil is then heated to about 130° F. and 1 to 10% of its volume of an aqueous solution containing 10 to 15% of the sodium salt of green sulfonic acids is added to it and thoroughly agitated. The mixture is heated to below the boiling point of water, for example, to about 180° F., and is permitted to stand for several hours, or if convenient, over night. Perfect stratification takes place, and the aqueous solution, containing the mahogany sulfonated compounds as well as the green compounds, is drawn off. It may be utilized in any desired manner, for example, as a detergent, fat-splitting reagent, or the like. The separated oil is washed with water once or twice, and may be subjected to any desired further treatment.

It is apparent that the invention may likewise be applied to the separation of the oil-dissolved sulfonic acids by adding to the aqueous solution of salts of the green sulfonic acids the alkali necessary for the neutralization of the acids contained in the oil after its initial separation from the acid sludge. The removal of the oil-dissolved sulfonated compounds will then take place simultaneously with the neutralization of the acids present in the oil.

The solution of the green sulfonic acids possesses in like manner with the solution of their salts the capacity to remove the oil-dissolved sulfonated compounds from the acid treated oil without the formation of stable emulsions. Hence an aqueous solution of the green sulfonic acids may be used for washing the oil directly after its separation from the acid sludge, thereby removing the oil dissolved sulfonated compounds, and the treated oil may be subsequently neutralized or subjected to other treatment in any desired manner.

If desired, the solution of "green" sulfo compounds utilized may contain a greater or less amount of the "mahogany" compounds where it is found unnecessary or undesirable to remove the latter by extraction with oil as hereinbefore described.

Although my invention has been hereinbefore described in connection with a specific example of its application, it is not intended that the details presented are to be regarded as limitations upon the scope of the invention, except in so far as included in the accompanying claims.

I claim:

1. In the process of purifying acid-treated hydrocarbon, the step which consists in extracting such oils with an aqueous solution of "green" sulfonated mineral oil compounds, thereby removing the oil-dissolved sulfonated compounds.

2. The process of refining oil which consists in treating oil with sulfuric acid, separating the oil from the acid sludge and treating the separated oil with an aqueous solution of "green" sulfonated mineral oil compounds in the presence of a neutralizing agent, thereby removing the oil-dissolved sulfonated compounds.

3. The process of refining oil which consists in treating oil with sulfuric acid, separating the oil from the acid sludge, neutralizing the oil, and agitating the neutralized oil with an aqueous solution of the alkali metal salts of "green" mineral oil sulfonic acids, and separating the treated oil from the aqueous solution.

4. The process of refining oil which consists in treating oil with sulfuric acid, separating the oil from the acid sludge, neutralizing the oil with soda and extracting the oil with a 10–15% aqueous solution of sodium salts of "green" mineral oil sulfonic acids.

5. The process which consists in extracting neutralized acid treated hydrocarbons with neutralized "green" mineral oil sulfonic acids in aqueous solution.

6. The process of preventing emulsification of oils with water which consists in preliminarily adding to the latter "green" sulfocompounds of mineral oils.

7. The method of treating mineral oil, as petroleum or petroleum products, which consists in washing the same without substantial emulsification thereof with an aqueous solution of sludge sulfonates.

8. The process of preventing emulsification of oils with water which consists in preliminarily adding to the latter sulfo-compounds of mineral oil acid sludge.

9. In the process of purifying acid-treated hydrocarbon, the step which consists in extracting such oils with an aqueous solution of the alkali metal salts of mineral oil acid sludge sulfonic acids.

10. In the process of purifying acid treated hydrocarbons, the step which consists in extracting such oils with an aqueous solution containing water soluble sulfo-compounds derived from the treatment of hydrocarbon oil with fuming sulfuric acid, thereby removing the oil dissolved sulfonated compounds.

11. The method of washing mineral oil of the character of petroleum or petroleum products, which consists in agitating said oil, while maintained at suitable viscosity, in the presence of water and of water soluble sulfo compounds derived from the treatment of mineral oils with strong sulfuric acid, the proportions of water and sulfo compounds being such as to prevent emulsification of the oil and cause removal therefrom into the water of the emulsification inducing contents.

OSCAR E. BRANSKY.